(12) United States Patent
Johannes et al.

(10) Patent No.: US 9,644,747 B2
(45) Date of Patent: May 9, 2017

(54) MECHANICAL SEAL HAVING A PRECISELY POSITIONED BANDAGE

(71) Applicant: EagleBurgmann Germany GmbH & Co. KG, Wolfratshausen (DE)

(72) Inventors: Rolf Johannes, Wolfratshausen (DE); Reinhard Svejkovsky, Geretsried (DE); Berthold Schulten, Geretsried (DE); Ernst Pochmann, Kochel am See (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 14/920,144

(22) PCT Filed: Mar. 18, 2014

(86) PCT No.: PCT/EP2014/055377
§ 371 (c)(1),
(2) Date: Oct. 22, 2015

(87) PCT Pub. No.: WO2014/173587
PCT Pub. Date: Oct. 30, 2014

(65) Prior Publication Data
US 2016/0116070 A1    Apr. 28, 2016

(30) Foreign Application Priority Data
Apr. 24, 2013  (DE) .................. 10 2013 007 163

(51) Int. Cl.
*F16J 15/34*    (2006.01)
(52) U.S. Cl.
CPC ....... *F16J 15/3472* (2013.01); *F16J 15/3468* (2013.01)

(58) Field of Classification Search
CPC ...... F16J 15/34; F16J 15/3436; F16J 15/3464; F16J 15/3472; F16J 15/348
See application file for complete search history.

(56) References Cited

U.S. PATENT DOCUMENTS

| 5,026,076 | A | * | 6/1991 | Back | F16J 15/3464 |
| | | | | | 277/390 |
| 5,893,564 | A | * | 4/1999 | Yang | F16J 15/348 |
| | | | | | 277/374 |

(Continued)

FOREIGN PATENT DOCUMENTS

| CN | 101688612 A | 3/2010 |
| CN | 202732975 U | 2/2013 |

(Continued)

OTHER PUBLICATIONS

International Search Report dated Jun. 4, 2014 in connection with PCT Application No. PCT/EP2014/055377.

(Continued)

*Primary Examiner* — Gilbert Lee
(74) *Attorney, Agent, or Firm* — Locke Lord LLP; Scott D. Wofsy; Joshua L. Jones

(57) ABSTRACT

The invention relates to a mechanical seal arrangement comprising a rotating slide ring (2) and a stationary slide ring (3) which define a sealing gap (4) between them and a bandage (15) which is arranged on the outer surface of at least one of the slide rings, the slide ring (2) on which the bandage (15) is arranged comprising a step (25), which extends completely on the outer circumferential face in the circumferential direction and has a contact face (26), and an end face (17) of the bandage (15) lying against the contact face (26) of the step (25).

14 Claims, 4 Drawing Sheets

(56) References Cited

U.S. PATENT DOCUMENTS

Figure 1:
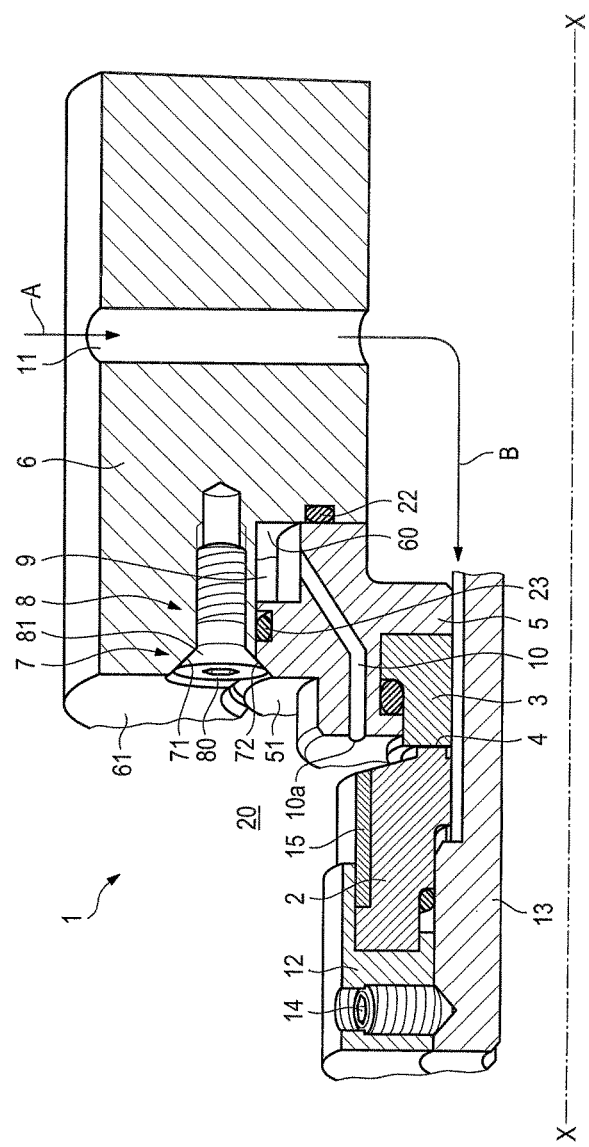

| | | | | |
|---|---|---|---|---|
| 2008/0290606 A1* | 11/2008 | Schwerdtfeger | ....... | F16J 15/348 277/364 |
| 2011/0221136 A1* | 9/2011 | Dudek | ................... | F16J 15/348 277/306 |
| 2013/0094794 A1* | 4/2013 | Willimczik | .......... | F16J 15/3464 384/477 |

FOREIGN PATENT DOCUMENTS

| | | |
|---|---|---|
| DE | 7602164 U1 | 10/1976 |
| DE | 3143384 A1 | 5/1983 |
| EP | 0163450 A1 | 12/1985 |
| EP | 0327845 A2 | 8/1989 |
| EP | 0721079 A1 | 7/1996 |
| WO | WO-2008136757 A1 | 11/2008 |

OTHER PUBLICATIONS

Search Report in connection with priority application No. DE102013007163.1.
Notification of the first Office Action issued Jul. 22, 2016 by the Chinese Patent Office for Application No. 201480023037.4.

* cited by examiner

MECHANICAL SEAL HAVING A PRECISELY POSITIONED BANDAGE

The present invention relates to a mechanical seal arrangement having a slide ring which has a bandage arranged precisely positioned.

Mechanical seal arrangements are known in various forms from the prior art. In slide rings which are subjected to high loads, a bandage may be provided which encloses the outer circumference of the slide ring. The bandage may for example be applied to the slide ring by shrinking or the like. However, the shrinking process can result in the bandage not being arranged precisely positioned on the slide ring. This can result in problems due to imbalances or non-uniform thermal deformations and the like during operation, in particular if the bandage is arranged on the rotating slide ring.

This can lead to excessive wear, high leakage and premature failure of the mechanical seal arrangement.

The object of the present invention is therefore to provide a mechanical seal arrangement which, while being of simple construction and being easy and inexpensive to produce, makes it possible to position a bandage exactly on a slide ring.

This object is achieved by a mechanical seal arrangement having the features of claim 1. The dependent claims disclose preferred developments of the invention.

The mechanical seal arrangement according to the invention having the features of claim 1 comprises a rotating and a stationary slide ring which define a sealing gap between them. At least one bandage is further provided, and is arranged on an outer circumferential face of at least one of the slide rings. The bandage thus exerts a radially inwardly directed force on the slide ring. The slide ring on which the bandage is arranged further comprises a step, which extends completely on the outer circumferential face in the circumferential direction and has a contact face. The bandage is thus arranged on the outer circumferential face in such a way that an end face of the bandage lies against the contact face of the step of the slide ring. As a result, the bandage can always be applied to the contact face in a simple manner, in such a way that the contact face acts as a stop during the assembly process of the bandage and the bandage can always be positioned identically. The step on the outer circumferential face of the slide ring also prevents undesired movement of the bandage during a shrinking process, in such a way that the bandage is arranged on the outer circumferential face of the slide ring with extremely high positional precision.

It is further preferred for the bandage to comprise a bevel on a radially inner edge on the first end face which lies against the contact face of the step on the slide ring. This prevents an inner edge of the bandage from potentially pressing against the slide ring and damaging it during assembly.

Preferably, the bandage is arranged on the rotating slide ring. As a result, imbalances or non-uniform thermal deformations on the rotating slide ring, which may occur in the art as a result of incorrect positioning of the bandage, can be prevented.

It is further preferred for a holder to engage around the bandage at least in part. Particularly preferably, the holder engages around both the bandage and the slide ring. In this context, the holder is in contact both with the outer circumferential face of the bandage and with the exposed outer circumferential face of the slide ring. In this context, the holder serves in particular for rotation and for transmitting a torque of a shaft.

According to a further preferred embodiment of the present invention, the width of the bandage in the axial direction of the mechanical seal arrangement is at least as large as half the width of the slide ring in the axial direction. Particularly preferably, the bandage has a width of approximately 0.5 to 0.8 times the width of the slide ring in the axial direction.

It is further preferred for the thickness of the slide ring in the region of the bandage to be at least 5 times the thickness of the bandage.

Particularly inexpensive production is possible if the contact face of the step on the slide ring extends perpendicular to the longitudinal axis of the mechanical seal arrangement.

Particularly preferably, in this case the thickness of the bandage is greater than or equal to the depth of the step on the slide ring. For an equal thickness and depth, the outer circumferential face of the bandage and the exposed outer circumferential face of the slide ring form a substantially cylindrical face. If the bandage is thicker than the depth, the bandage projects radially from the slide ring. As a result, a holder can only act on the bandage and does not touch the slide ring.

Particularly preferably, the slide ring has exactly one step on the outer circumferential region thereof. As a result, a particularly simple construction of the slide ring and bandage is achieved.

It is further preferred for the mechanical seal arrangement further to comprise a first and a second bandage. In this case, the second bandage is arranged on the outer surface of the first bandage. As a result, it is possible to provide two bandages having different properties. For example, the outer bandage may have a high chemical resistance to a medium to be sealed against, and thus protect the inner bandage. By contrast, the inner bandage may for example have a high mechanical strength. Particularly preferably, exactly two bandages are provided, which are arranged directly above one another in the radial direction.

Particularly preferably, a first contact face for the first bandage and a second contact face for the second bandage are provided on the slide ring. As a result, both bandages can be positioned exactly on the slide ring.

It is further preferred for two bandages to be provided on one step.

It is further preferred for the second bandage to cover the first bandage completely on the outer surface thereof. As a result, the second bandage can for example provide protection against chemically aggressive media.

It is further preferred for a holder to engage around the second bandage at least in part. As a result, the slide ring having the two bandages can be positioned securely, and further, by way of the holder, torque can be introduced to the slide ring via the bandages.

It is further preferred for the bandage to be arranged over a centre of area of the slide ring, the centre of area being determined by way of a section in the direction of the longitudinal axis of the slide ring.

The present mechanical seal arrangement is particularly preferably used in connection with pumps.

Figure 2:
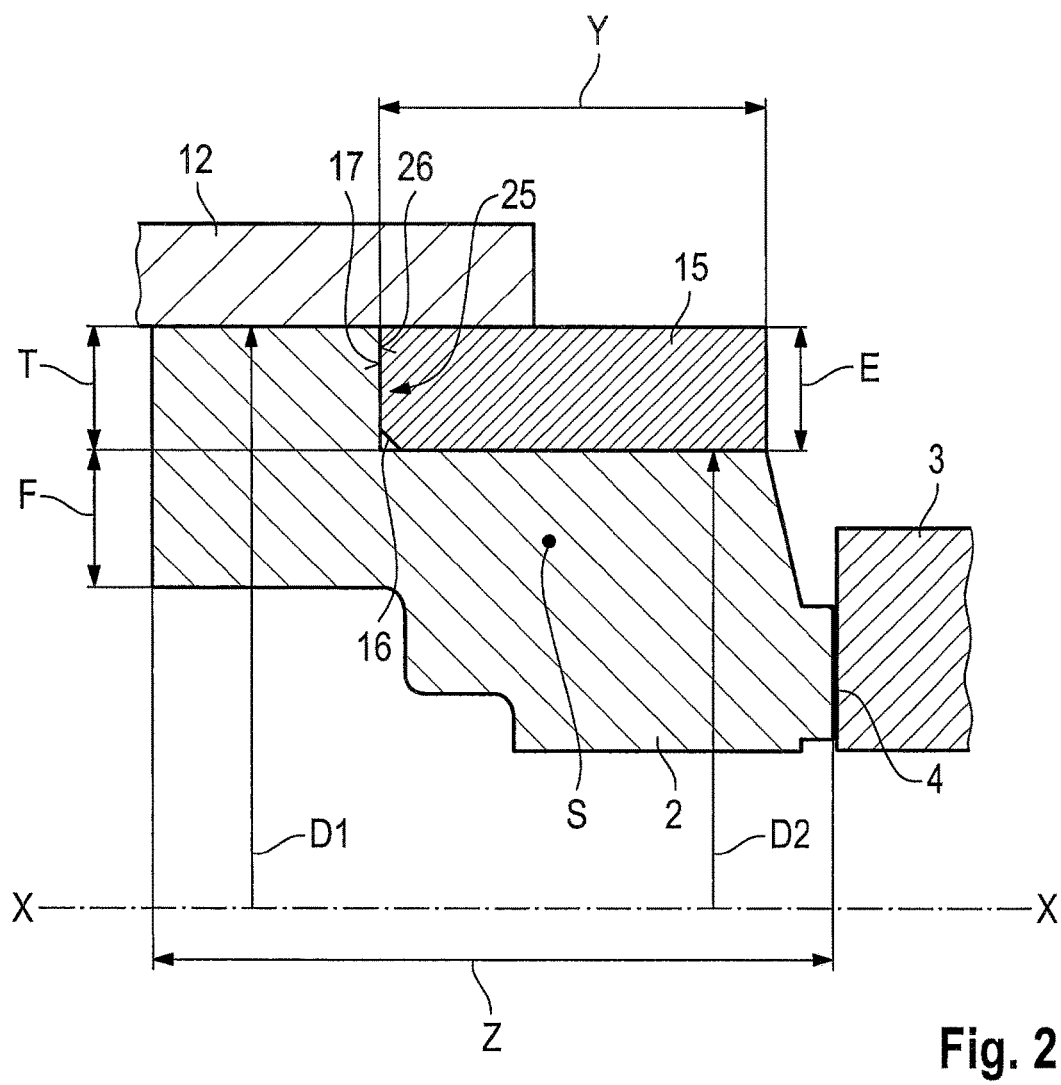
Figure 3:
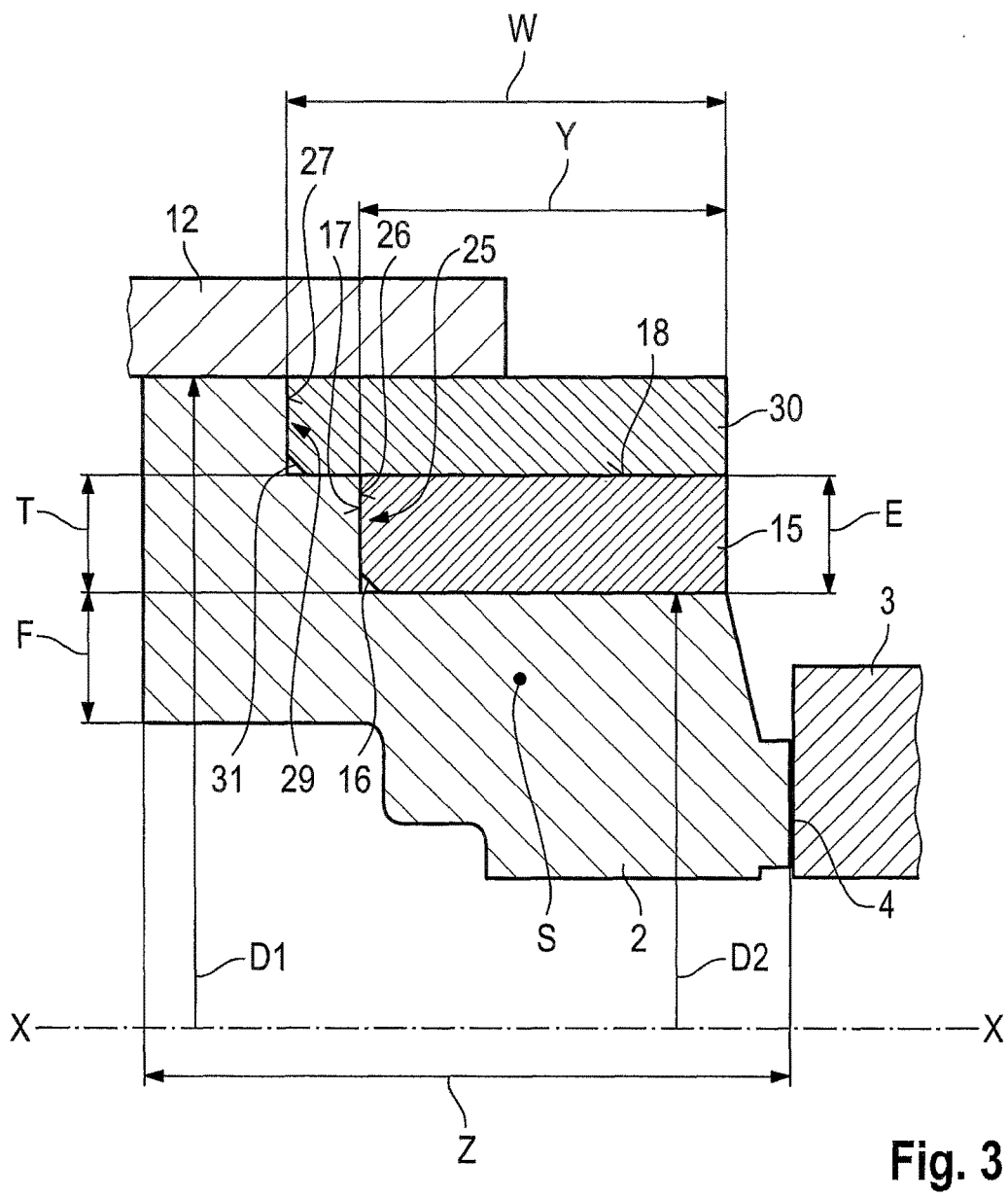
Figure 4:
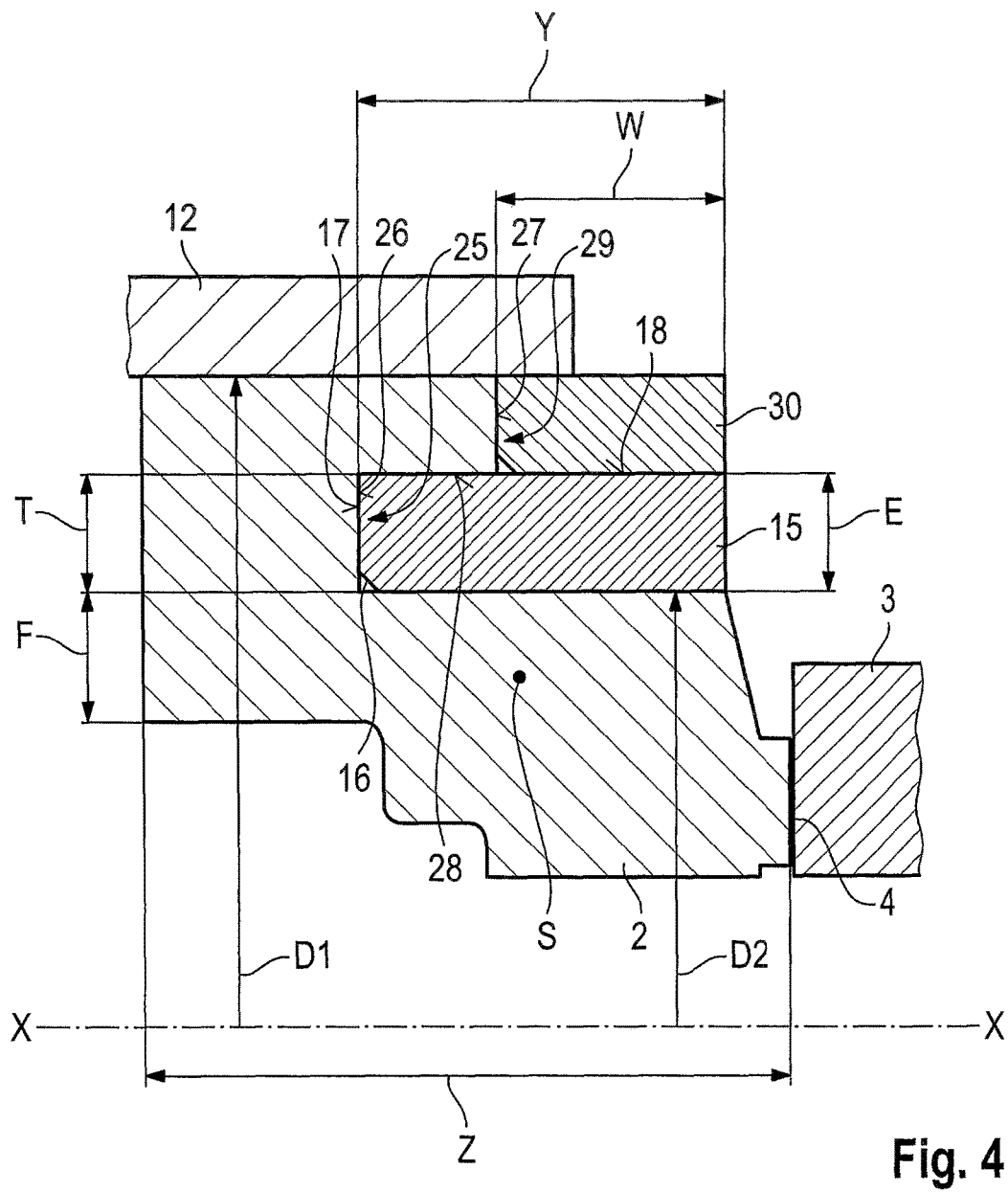

Preferred exemplified embodiments of the invention are described in detail hereinunder with reference to the accompanying drawings. In the drawings, like or functionally equivalent parts are denoted by like reference numerals. In the drawings:

FIG. 1 is a schematic, partially cross-sectional, perspective view of a mechanical seal arrangement according to a first exemplified embodiment of the invention, FIG. 2 is a schematic, enlarged cross-sectional view of the rotating slide ring having a bandage of FIG. 1, FIG. 3 is a schematic, enlarged cross-sectional view of a rotating slide ring according to a second exemplified embodiment of the invention, and FIG. 4 is a schematic, enlarged cross-sectional view of a rotating slide ring according to a third exemplified embodiment of the invention.

A mechanical seal arrangement 1 according to a first preferred exemplified embodiment of the invention is described in detail hereinunder with reference to FIGS. 1 and 2.

As can be seen from FIG. 1, the mechanical seal arrangement 1 according to the invention comprises a rotating slide ring 2 and a stationary slide ring 3, which define a sealing gap 4 between them in a known manner. The rotating slide ring 2 has a bandage 15 on the outer circumference thereof, a rotation of a shaft (not shown) being transmitted from the shaft to a shaft sleeve 13 and from the shaft sleeve 13 to a holder 12, which is connected to the shaft sleeve 13 by connecting screws 14. The holder 12 engages on the outer face of the bandage 15 and transmits a torque to the rotating slide ring 2. The holder 12 engages around the bandage in part in the axial direction X-X.

The stationary slide ring 3 is connected to a single-piece housing 6 via a holding ring 5. As can be seen from FIG. 1, the holding ring 5 engages around the stationary slide ring 3 in the axial direction X-X of the mechanical seal arrangement.

A clamp connection 7 is formed between the holding ring 5 and the housing 6. In this exemplified embodiment, the clamp connection 7 is formed by a clamp component 8, which in this exemplified embodiment is a countersunk bolt. A plurality of clamp components 8 are provided on a diameter on the housing 6. For clamping, the clamp component 8 comprises a head 80 and a cone 81 arranged on the underside of the head. Further, the housing 6 comprises a first conical region 71 and the holding ring 5 comprises a second conical region 72. The cone 81 of the clamp component 8 is in contact with the first and second conical regions 71, 72 and, by way of a clamping force applied thereto, connects the housing 6 to the holding ring 5.

As can be seen from FIG. 1, the clamp connection 7 is arranged on an end face 61 of the housing 6. This makes the clamp connection easily accessible, in such a way that the clamp connection can rapidly and easily be established and released again.

As can further be seen from FIG. 1, the holding ring 5 comprises a projection 51 on which the second conical region 72 is formed. As a result, the clamp connection 7 is offset radially outwards, further improving the ease of access.

As can be seen from FIG. 1, the housing 6 is formed in a single piece, and aside from the axial holes for receiving the clamp components 8 no further holes for interconnecting housing parts or the like have to be provided. As a result, lines, such as a medium line 11, can be positioned as desired in the housing 6. The medium line 11 of this exemplified embodiment serves to supply a sealing medium to the inside of the mechanical seal, as is indicated by the arrows A and B. The mechanical seal arrangement 1 thus seals off a product region 20 from the environment.

Further, the housing 6 comprises a contact face 60 against which the holding ring 5 lies. As a result of the projection 51 provided on the holding ring 5, a circumferential fluid duct 9 can be formed between the holding ring 5 and the housing 6. In this exemplified embodiment, the fluid duct 9 has a rectangular cross-section and is provided annularly on the outer surface of the holding ring 5. First and second O-rings 22, 23 serve to seal off the fluid duct 9. Further, at least one connection duct 10 is formed in the holding ring 5, and connects the fluid duct 9 to the product region 20. An opening 10a of the connection duct 10 is close to the sealing gap 4 of the mechanical seal arrangement. As a result, it is made possible in particular to rinse the mechanical seal arrangement at the radially outer region of the two slide rings 2, 3.

As can be seen in particular from FIG. 2, the rotating slide ring 2 has exactly one step 25 on an outer circumferential face. The step 25 forms a contact face 26 arranged perpendicular to the axial direction X-X. The step 25 has a depth T. As a result of the step 25 being provided, the outer circumferential surface of the rotating slide ring thus has a largest diameter D1 and a smallest diameter D2. According to the invention, the bandage 15 is now arranged at the smallest diameter, the bandage 15 being arranged on the smallest diameter D2 of the rotating slide ring 2 in such a way that an end face 17 of the bandage lies against the contact face 26 of the step 25.

The bandage 15 further has a wide bevel 16 on an inner circumferential edge, which is positioned in the region of the step 25. This prevents a sharp inner edge of the bandage 15 from damaging the slide ring.

The bandage 15 is applied to the rotating slide ring 2 by a shrinking process. As a result of the contact face 26 in the region of the step 25, it can be ensured during the shrinking process that the bandage 15 exactly maintains the provided position thereof on the outer circumference of the rotating slide ring. The problem occurring in the art of the bandage sliding in the axial direction during the shrinking process can thus be prevented. Rapid, simple assembly of the bandage 15 prior to the shrinking process on the outer circumference of the rotating slide ring 2 can also be carried out, since the bandage 15 merely has to be slid on as far as the contact face 26. In this case, no subsequent measurement and retroactive correction or the like is required for keeping to a predetermined position of the bandage on the outer circumference of the slide ring.

The bandage 15 further has a thickness E in the radial direction, the thickness E of the bandage 15 being at least as large as the minimal thickness F of the rotating slide ring 2, in a region Y of the slide ring which is covered by the bandage 15.

As can further be seen from FIG. 2, the bandage 15 is arranged on the rotating slide ring 2 in such a way that an area centre S of the slide ring, which forms a centre of gravity of a section area of the slide ring in the axial direction, is covered by the bandage 15. Preferably, the bandage is arranged centrally about the area centre S.

The bandage 15 further has a width in the axial direction X-X (marked by the region Y in FIG. 2) which is at least as large as half the width of the rotating slide ring 2 in the axial direction.

It is further preferred for the holder 12 to cover at least a third of the width Y of the bandage 15. The holder 12 is thus in contact both with the bandage 15 and with the larger diameter D1 of the rotating slide ring, so as to make reliable torque transmission possible.

According to the invention, it can thus be ensured that the bandage 15 is always arranged precisely positioned on the outer circumference of the slide ring using a very simple and rapid assembly step. Even after the shrinking process, it can be checked in a simple manner whether the bandage 15 has been shrunk onto the slide ring at exactly the predetermined position, since there should not be any gap between the bandage 15 and the slide ring 2 in the region of the contact face 26. If a gap is present, it can immediately be seen that the bandage 15 is not exactly positioned, and the slide ring can be rejected.

FIG. 3 shows a mechanical seal arrangement according to a second exemplified embodiment of the invention. Unlike in the first exemplified embodiment, the mechanical seal arrangement of the second exemplified embodiment has a first bandage 15 and a second bandage 30. The second bandage 30 is arranged radially outside the first bandage 15. As can be seen immediately from FIG. 3, the second bandage 30 lies against the outer surface 18 of the first bandage 15. The slide ring 2, which is also the rotating slide ring, further has a first step 25 comprising a first contact face 26 and a second step 29 comprising a second contact face 27. Thus, in the assembled state, the first bandage 15 lies against the first contact face 26 and the second bandage 30 lies against the second contact face 27. As can further be seen from FIG. 3, the second bandage 30 has a width W in the axial direction X-X which is greater than the width Y of the first bandage 15. The second bandage 30 further completely covers the first bandage 15. The second bandage thus protects the first bandage, for example against aggressive influences of a medium to be sealed against. To prevent damage, the second bandage 30 also has a wide bevel 31 to prevent damage to the slide ring 2.

The holder 12 further engages around the second bandage 30 in part. The torque can thus be transmitted to the slide ring 2 via the second bandage 30 and the first bandage 15. Preferably, the holder 12 engages around at least half of the width W of the second bandage 30.

The use of two bandages 15, 30 on the slide ring thus makes it possible for the two bandages to be configured for different properties. As a result of the two steps being provided with the two contact faces 26, 27, both bandages 15, 30 can thus be positioned securely and precisely. In this context, the two bandages 15, 30 may be assembled either simultaneously or in succession.

FIG. 4 shows a mechanical seal arrangement according to a third exemplified embodiment of the invention. The third exemplified embodiment substantially corresponds to the second exemplified embodiment, and likewise comprises two bandages 15, 30. However, unlike in the second exemplified embodiment, in the third exemplified embodiment a groove-shaped depression 28 is formed in the slide ring 2. The groove-shaped depression 28 is opened in the axial direction X-X in the direction of the stationary slide ring 3. The groove-shaped depression 28 thus receives the first bandage 15 at least in part. In particular in connection with the holder 12, this configuration of the mechanical seal arrangement makes it possible to hold the first bandage 15 particularly securely on the rotating slide ring 2. The second bandage 30 has a width W in the axial direction X-X which is smaller than the width Y of the first bandage 15. The thickness of the two bandages is preferably equal.

The exemplified embodiments disclosed in FIGS. 3 and 4, comprising exactly two bandages 15, 30, thus make it possible for each bandage to be configured exactly as regards the desired properties thereof. For example, the outer, second bandage 30 may have a higher chemical resistance than the inner, first bandage 15. In this context, the material selection for the second bandage 30 is selected as a function of a chemical aggressiveness of the medium to be sealed off.

LIST OF REFERENCE NUMERALS 1 mechanical seal arrangement
2 rotating slide ring
3 stationary slide ring
4 sealing gap
5 holding ring
6 housing
7 clamp connection
8 clamp component
9 fluid duct
10 connection duct
10a opening of the connection duct 10
11 medium duct
12 holder
13 shaft sleeve
14 connecting screws
15 bandage
16 bevel
17 end face of the bandage
18 outer surface of the first bandage
20 product region
22, 23 O-rings
25 step
26 contact face on the rotating slide ring
27 second contact face
28 groove-shaped depression
29 second step
30 second bandage
31 bevel
51 projection
60 contact face on the housing
61 end face of the housing
71 first conical region
72 second conical region
80 head
81 cone
A, B arrows
D1 largest diameter at the outer surface of the rotating slide ring
D2 smallest diameter at the outer surface of the rotating slide ring
E thickness of the bandage
F minimum thickness of the rotating slide ring in the region of the bandage
T depth of the step
W width of the second bandage
X-X axial direction
Y width of the bandage
Z width of the slide ring

The invention claimed is:

1. Mechanical seal arrangement comprising:
a rotating slide ring and a stationary slide ring which define a sealing gap between them;
a bandage which is arranged on the outer surface of at least one of the slide rings,
wherein the slide ring on which the bandage is arranged includes a step, which extends completely on the outer circumferential face in the circumferential direction and has a contact face, and
wherein an end face of the bandage lies against the contact face of the step, wherein the bandage is applied to the rotating ring by a thermal shrinking process, so that the bandage is fixed relative to and exerts a radially inward directed force on the slide ring for transmitting torque to the slide ring.

2. Mechanical seal arrangement as claimed in claim 1, wherein the bandage has a bevel on the radially inner circumference on the first end face.

3. Mechanical seal arrangement as claimed in claim 1, wherein the bandage is arranged on the rotating slide ring.

4. Mechanical seal arrangement as claimed in claim 1, wherein a holder engages around the bandage at least in part.

5. Mechanical seal arrangement as claimed in claim 1, wherein the width (Y) of the bandage in the axial direction (X-X) is at least as large as half the width (Z) of the slide ring in the axial direction (X-X).

6. Mechanical seal arrangement as claimed in claim 1, wherein the minimum thickness (F) of the slide ring in the region of the bandage is at least as large as the thickness (E) of the bandage.

7. Mechanical seal arrangement as claimed in claim 1, wherein the stop face extends perpendicular to the axial direction (X-X) of the slide ring arrangement.

8. Mechanical seal arrangement as claimed in claim 1, wherein the thickness (E) of the bandage is greater than or equal to the depth (T) of the step of the slide ring.

9. Mechanical seal arrangement as claimed in claim 1, wherein the slide ring has exactly one step on the outer surface.

10. Mechanical seal arrangement as claimed in claim 1, comprising a first bandage and a second bandage which is arranged on the outer surface of the first bandage.

11. Mechanical seal arrangement as claimed in claim 10, wherein the rotating slide ring has a first contact face against which the first bandage lies and a second contact face against which the second bandage lies.

12. Mechanical seal arrangement as claimed in claim 10, wherein the second bandage completely covers the first bandage.

13. Mechanical seal arrangement as claimed in claim 10, wherein the slide ring has a groove-shaped depression, in which the first bandage is arranged at least in part.

14. Mechanical seal arrangement comprising:
a rotating slide ring and a stationary slide ring which define a sealing gap between them;
a bandage which is arranged on the outer surface of at least one of the slide rings,
wherein the slide ring on which the bandage is arranged includes a step, which extends completely on the outer circumferential face in the circumferential direction and has a contact face, and
wherein an end face of the bandage lies against the contact face of the step, wherein the bandage is applied to the rotating ring by a shrinking process, so that the bandage is fixed relative to and exerts a radially inward directed force on the slide ring for transmitting torque to the slide ring, wherein the bandage has a cross-sectional shape of a rectangle with one bevelled corner, and wherein the bevelled corner is on an inner circumferential edge of the bandage and wherein the bevelled corner is in the region of the step.

* * * * *